US009422850B2

(12) United States Patent
Myer et al.

(10) Patent No.: US 9,422,850 B2
(45) Date of Patent: Aug. 23, 2016

(54) UREA INJECTION SYSTEMS VALVES

(75) Inventors: Andrew Myer, Greenwood, IN (US);
Chetan Ponnathpur, Columbus, IN (US); John Heichelbech, Columbus, IN (US); George Muntean, Columbus, IN (US); Stephen Holl, Columbus, IN (US); James F. Burke, Columbus, IN (US); John Anthis, Columbus, IN (US); Joydeep Chakrabarti, Columbus, IN (US); Brandon Simmons, Columbus, IN (US); Niklas Schmidt, Madison, WI (US); Yogesh V. Birari, Pune (IN)

(73) Assignee: Cummins Emission Solutions, Inc., Columbus, IN (US)

( * ) Notice: Subject to any disclaimer, the term of this patent is extended or adjusted under 35 U.S.C. 154(b) by 226 days.

(21) Appl. No.: 14/238,818

(22) PCT Filed: Aug. 22, 2012

(86) PCT No.: PCT/US2012/051829
§ 371 (c)(1),
(2), (4) Date: Sep. 12, 2014

(87) PCT Pub. No.: WO2013/028741
PCT Pub. Date: Feb. 28, 2013

(65) Prior Publication Data
US 2015/0027553 A1 Jan. 29, 2015

Related U.S. Application Data

(60) Provisional application No. 61/526,102, filed on Aug. 22, 2011.

(51) Int. Cl.
*F01N 3/20* (2006.01)
*F16K 11/10* (2006.01)
*F04B 43/02* (2006.01)

(52) U.S. Cl.
CPC .............. *F01N 3/208* (2013.01); *F01N 3/2066* (2013.01); *F04B 43/02* (2013.01); *F16K 11/10* (2013.01);

(Continued)

(58) Field of Classification Search
CPC ... F01N 3/208; F01N 3/2066; F01N 2610/00; F01N 2610/02; F01N 2610/146; Y02T 10/24; F16K 11/10; F04B 43/02; Y10T 137/0391; Y10T 137/0396; Y10T 137/428–137/4329; Y10T 137/7835; Y10T 137/7836; Y10T 137/7879–137/7896; Y10T 137/86815; Y10T 137/86823; Y10T 137/87571–137/87692
USPC ......... 137/509, 510, 602–607, 625.4, 625.41, 137/243–243.7, 843–860; 251/333, 334; 60/286
See application file for complete search history.

(56) References Cited

U.S. PATENT DOCUMENTS 2,179,165 A * 11/1939 Sifkovitz ................ F16K 41/14
137/902
2,330,881 A * 10/1943 Gora ...................... F16K 15/063
251/334

(Continued)

FOREIGN PATENT DOCUMENTS

CN 2787877 6/2006

OTHER PUBLICATIONS

International Search Report and Written Opinion for PCT/US2012/051829, issued Nov. 16, 2012, 11 pages.

(Continued)

*Primary Examiner* — William McCalister
(74) *Attorney, Agent, or Firm* — Foley & Lardner LLP

(57) ABSTRACT

Apparatuses and methods for urea dosing of an exhaust after treatment system are disclosed. Exemplary apparatuses include a chamber configured to receive pressurized gas at a first inlet, receive urea solution at a second inlet, and provide a combined flow of pressurized gas and urea to an outlet, a flow passage extending from the first inlet to a seating surface, and a valve member configured to move between an open position in which the valve member is spaced apart from the seating surface and a closed position in which the valve member contacts the seating surface. As the valve member moves from the open position to the closed position the valve member contacts the seating surface at a first location and wipes an area of the seating surface extending from the first location in a direction toward the flow passage.

10 Claims, 13 Drawing Sheets

(52) U.S. Cl.
CPC ......... *F01N 2610/00* (2013.01); *F01N 2610/02* (2013.01); *F01N 2610/146* (2013.01); *Y02T 10/24* (2013.01); *Y10T 137/0391* (2015.04); *Y10T 137/0396* (2015.04); *Y10T 137/7836* (2015.04); *Y10T 137/86815* (2015.04); *Y10T 137/87676* (2015.04); *Y10T 137/87684* (2015.04)

(56) References Cited

U.S. PATENT DOCUMENTS

| | | | | |
|---|---|---|---|---|
| 2,410,960 A * | 11/1946 | Bunn | ................ | F16K 1/36 137/338 |
| 2,608,801 A * | 9/1952 | Ridley | ................ | B24C 5/04 137/859 |
| 2,716,575 A * | 8/1955 | Vickers | ................ | B01J 8/082 251/5 |
| 2,770,443 A * | 11/1956 | Rand | ................ | F16K 1/38 251/218 |
| 2,784,732 A * | 3/1957 | Nurkiewicz | ................ | A62C 13/003 137/244 |
| 2,804,763 A * | 9/1957 | Russell | ................ | F23Q 2/173 222/3 |
| 2,904,305 A * | 9/1959 | Novotny | ................ | A62C 13/006 251/175 |
| 3,009,681 A * | 11/1961 | Carter | ................ | A62C 13/003 251/240 |
| 3,090,596 A * | 5/1963 | Gifford | ................ | F16K 1/38 251/333 |
| 3,330,527 A * | 7/1967 | Nurkiewicz | ................ | A62C 13/003 251/114 |
| 3,955,792 A * | 5/1976 | Cho | ................ | F16K 31/44 251/129.11 |
| 4,050,473 A * | 9/1977 | Cho | ................ | F16K 1/38 137/244 |
| 4,133,346 A * | 1/1979 | Smith | ................ | B60K 15/0406 137/493.6 |
| 4,188,013 A * | 2/1980 | Battersby | ................ | F23N 5/107 251/175 |
| 4,284,104 A * | 8/1981 | Beghini | ................ | B65D 77/225 137/859 |
| 4,410,302 A | 10/1983 | Chiba et al. | | |
| 4,420,101 A * | 12/1983 | O'Neill | ................ | B05B 11/047 137/493 |
| 4,475,899 A * | 10/1984 | Muller | ................ | A61F 2/004 137/522 |
| 4,822,003 A * | 4/1989 | Self | ................ | A62C 13/64 169/30 |
| 4,915,354 A * | 4/1990 | Sims, Jr. | ................ | F16K 1/42 251/334 |
| 5,388,613 A * | 2/1995 | Kruger | ................ | A62B 9/022 137/625.34 |
| 5,605,042 A * | 2/1997 | Stutzenberger | .... | B01D 53/9431 60/286 |
| 5,738,662 A * | 4/1998 | Shannon | ................ | A61M 5/1408 137/606 |
| 5,996,966 A * | 12/1999 | Zimmerly | ................ | F16K 1/46 137/240 |
| 6,041,594 A * | 3/2000 | Brenner | ................ | B01D 53/90 239/427.5 |
| 6,167,698 B1 | 1/2001 | King et al. | | |
| 6,178,986 B1 * | 1/2001 | Burmester | ................ | F16K 1/446 134/166 C |
| 6,192,677 B1 * | 2/2001 | Tost | ................ | B01D 53/9431 60/286 |
| 6,209,315 B1 * | 4/2001 | Weigl | ................ | B01D 53/9431 60/274 |
| 6,266,955 B1 | 7/2001 | Liang et al. | | |
| 6,293,097 B1 | 9/2001 | Wu et al. | | |
| 6,519,935 B2 * | 2/2003 | Weigl | ................ | B01D 53/9431 60/286 |
| 6,526,746 B1 * | 3/2003 | Wu | ................ | F01N 3/2066 239/585.1 |
| 6,845,611 B2 * | 1/2005 | Huthwohl | ................ | F01N 3/2066 60/280 |
| 6,991,188 B2 * | 1/2006 | Kobayashi | ................ | B24B 15/04 239/494 |
| 7,422,160 B2 * | 9/2008 | Dallmeyer | ................ | F02M 51/005 239/5 |
| 7,685,810 B2 | 3/2010 | Hirata et al. | | |
| 7,707,825 B2 * | 5/2010 | Dingle | ................ | F01N 3/035 60/274 |
| 7,775,036 B2 * | 8/2010 | Barcin | ................ | B01D 53/79 60/274 |
| 8,171,721 B2 * | 5/2012 | Boddy | ................ | F01N 3/36 60/274 |
| 8,201,393 B2 | 6/2012 | Zapf et al. | | |
| 8,266,892 B2 * | 9/2012 | Zapf | ................ | F01N 3/208 60/286 |
| 8,281,570 B2 * | 10/2012 | Gierszewski | ........ | F01N 3/2066 60/274 |
| 8,371,113 B2 * | 2/2013 | Jochumsen | ........ | F01N 3/2066 239/411 |
| 8,881,507 B2 | 11/2014 | Yan et al. | | |
| 8,888,017 B2 | 11/2014 | Ponnathpur et al. | | |
| 2004/0060286 A1 | 4/2004 | Huber et al. | | |
| 2004/0083723 A1 * | 5/2004 | Hager | ................ | B01D 53/9431 60/286 |
| 2004/0177606 A1 | 9/2004 | Scharsack | | |
| 2004/0191093 A1 | 9/2004 | Weigl | | |
| 2007/0186543 A1 | 8/2007 | Bakaj et al. | | |
| 2008/0092527 A1 * | 4/2008 | Ripper | ................ | B01D 53/90 60/286 |
| 2008/0282681 A1 * | 11/2008 | Katou | ................ | B01D 53/9409 60/286 |
| 2009/0031714 A1 | 2/2009 | Jochumsen et al. | | |
| 2010/0205948 A1 * | 8/2010 | Bauer | ................ | F01N 3/2066 60/303 |
| 2010/0319322 A1 | 12/2010 | Huthwohl | | |
| 2010/0327208 A1 * | 12/2010 | Doutt | ................ | F16K 11/044 251/333 |
| 2011/0042605 A1 * | 2/2011 | Gyger | ................ | F16K 1/42 251/333 |
| 2011/0139132 A1 | 6/2011 | Smith et al. | | |
| 2012/0160934 A1 | 6/2012 | Ponnathpur et al. | | |
| 2013/0061948 A1 * | 3/2013 | Haeberer | ................ | F01N 3/2066 137/315.01 |

OTHER PUBLICATIONS

International Preliminary Report on Patentability for International Application No. PCT/US2012/051809, dated Mar. 6, 2014, 6 pages.
International Search Report and Written Opinion for PCT/US2012/51809, issued Nov. 16, 2012, 8 pages.
Search Report and Written Opinion for PCT/US 2012/051782, issued Nov. 16, 2012, 8 pages.
First Office Action issued for Chinese Patent Application No. 201280041017.0 issued Aug. 13, 2015 and English translation.

* cited by examiner

UREA INJECTION SYSTEMS VALVES

CROSS REFERENCE TO RELATED APPLICATIONS

The present application is a U.S. National Stage Application of International Application No. PCT/US2012/051829, filed on Aug. 22, 2012, which claims benefit of and priority to U.S. Provisional Patent Application No. 61/526,102 filed Aug. 22, 2011. The entire contents of both applications are incorporated herein by reference in their entirety.

BACKGROUND

Selective catalytic reduction ("SCR") exhaust aftertreatment systems are an important technology for reducing NOx emissions from internal combustion engines such as diesel engines. SCR systems generally include a source of urea solution, a pump unit for pressurizing the urea solution, a metering unit for providing a controlled amount or rate of urea solution to an SCR catalyst, and an injector which provides urea solution to a urea decomposition region of an exhaust flowpath located upstream from an SCR catalyst. Many SCR systems also utilize pressurized gas to assist the flow of urea solution to the injector. While providing important reductions in NOx emissions, SCR systems suffer from a number of shortcomings and problems. Use of urea solutions in SCR systems may result in growth of urea crystals or deposits on various components of the system which may disrupt their operation. Injector nozzles may become blocked due to formation of urea deposits when urea solution is exposed to elevated temperatures. Such deposits may also form on the SCR catalyst or other components located in the exhaust flowpath or otherwise exposed to high temperatures. Leakage of urea to the ambient environment can damage or destroy other system components. There is a long felt need for advancements mitigating these and other shortcomings associated with SCR systems utilizing urea solution.

SUMMARY

Certain exemplary embodiments include apparatuses including a chamber configured to receive pressurized gas at a first inlet, receive urea solution at a second inlet, and provide a combined flow of pressurized gas and urea to an outlet, a flow passage extending from the first inlet to a seating surface, and a valve member configured to move between an open position in which the valve member is spaced apart from the seating surface and a closed position in which the valve member contacts the seating surface. As the valve member moves from the open position to the closed position the valve member contacts the seating surface at a first location and wipes an area of the seating surface extending from the first location in a direction toward the flow passage. Exemplary methods include closing a valve in an air supply circuit of a urea injection system effective to slide a closing member across a contact surface. Further aspects, embodiments, forms, features, benefits, objects, and advantages shall become apparent from the detailed description and figures provided herewith.

DETAILED DESCRIPTION OF EXEMPLARY EMBODIMENTS

Figure 1:
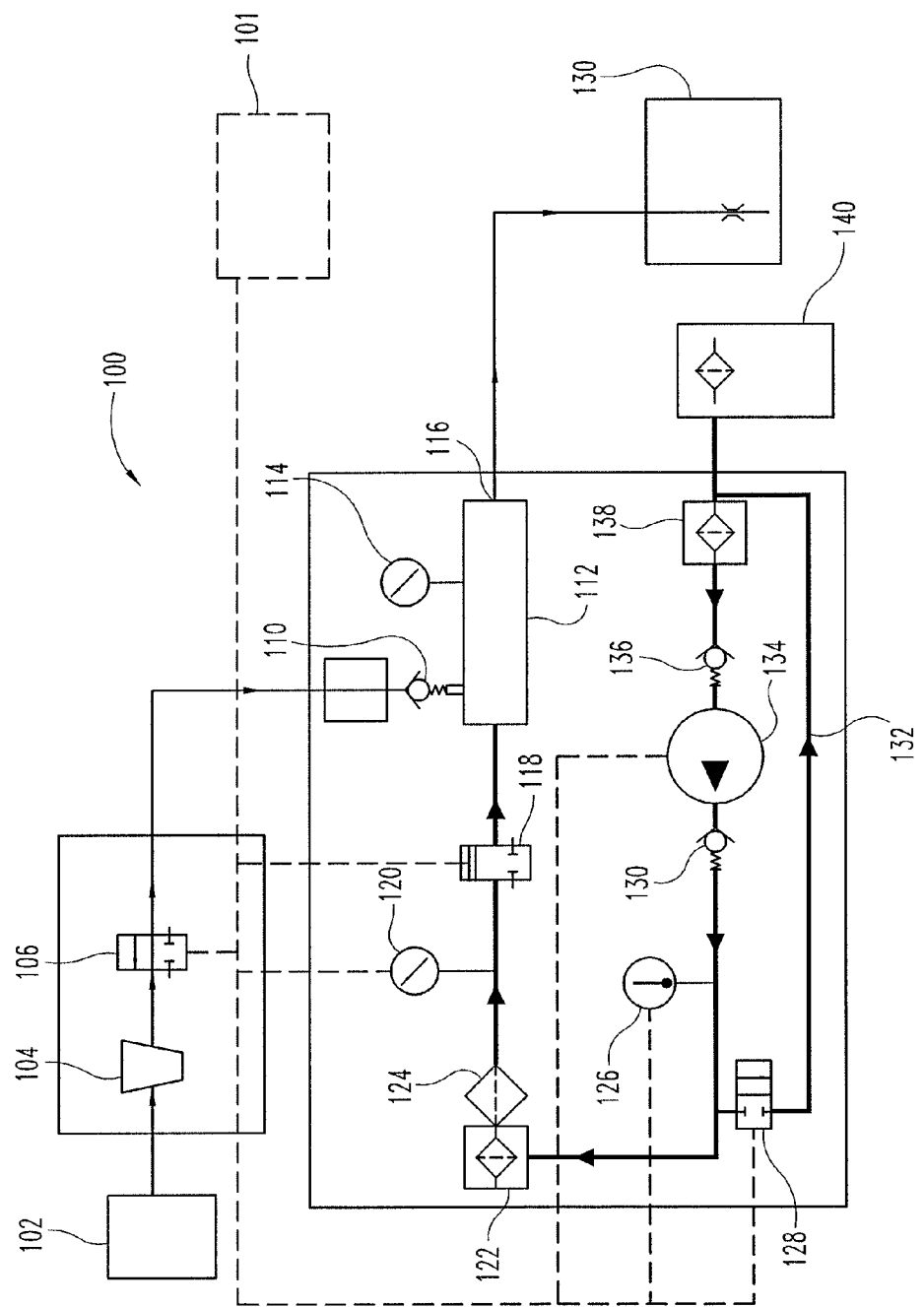
FIG. 1 is a schematic view of an exemplary air-assisted urea injection system.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

With reference to FIG. 1 there is illustrated an exemplary system 100 for injection of urea solution into an SCR exhaust aftertreatment system. System 100 may be provided on a vehicle powered by an engine such as a diesel engine, or on an engine utilized in other applications such power generation or pumping systems. System 100 includes a pump 134 which draws urea solution from tank 140 through filter screen 138 and check valve 136. A preferred urea solution is diesel exhaust fluid (DEF) which comprises a solution of 32.5% high purity urea and 67.5% deionized water. It shall be appreciated, however, that other urea solutions may also be utilized. In a preferred form pump 134 is a diaphragm pump, though it shall be appreciated that other types of pumps may be utilized. Pump 134 outputs pressurized urea solution at a predetermined pressure which flows through check valve 130, pulsation dampener 122, and filter 124 to provide pressurized urea solution to metering valve 118. System 100 further includes a bypass valve 128 which is operable to open and close to permit or prevent the flow of urea solution through bypass line 132 to a location downstream of screen 138 where it may be returned to the tank 140, for example, during a purging operation.

Metering valve 118 is operable to provide urea solution to blending chamber 112 at a controllable rate. Blending chamber 112 also receives a flow of pressurized air from an air supply 102 and discharges a combined flow of pressurized air and urea solution at outlet 116. Air supply 102 may be integral to a vehicle, integral to an engine, or may be an air supply dedicated to system 100. It shall be understood that additional embodiments may utilize pressurized gases other than air, for example, combinations of one or more inert gases.

Air supply 102 provides pressurized air to air regulator 104. From air regulator 104 pressurized air proceeds to air shutoff valve 106 which can be selectably opened to allow pressurized air to flow to check valve 110 and closed to obstruct the flow of pressurized air. Check valve 110 opens when the air pressure at its inlet is above a threshold pressure and closes when the air pressure is below the threshold. From check valve 110 pressurized air flows to blending chamber 112. A combined flow of aqueous urea solution entrained in pressurized air exits blending chamber outlet 116 and is provided to nozzle 113 which is configured to inject the combined flow into an exhaust aftertreatment system such as a urea decomposition tube or exhaust flow passage leading to an SCR catalyst.

System 100 may be controlled and monitored by a controller 101 such as an engine control module (ECM) or a doser control module (DCM). It shall be appreciated that the controller or control module may be provided in a variety of forms and configurations including one or more computing devices having non-transitory memory storing computer executable instructions, processing, and communication hardware. It shall be further appreciated that controller may be a single device or a distributed device, and the functions of the controller may be performed by hardware or software.

Controller 101 is operatively coupled with and configured to store instructions in a memory which are readable and executable by controller 101 to control diaphragm pump 134, air shut off valve 106, metering valve 118, and bypass valve 128. Controller 101 is also operatively coupled and may receive a signal from a pressure sensor 114, pressure sensor 120 and temperature sensor 126. Pressure sensor 114 is operable to provide a signal indicating the pressure in blending chamber 112 at a location downstream from the urea inlet and the pressurized air inlet. The pressure at this location may be pressure of a combined flow of pressurized air and urea, pressure of air alone, pressure of urea alone, or pressure in the absence of urea and compressed air depending on the operational state of metering valve 118 and air shut off valve 106. Temperature sensor 126 is operable to provide a signal to controller 101 indicating the temperature of urea solution at a location between diaphragm pump 134 and metering valve 118. Pressure sensor 120 is operable to provide a signal to controller 101 indicating the pressure of the urea solution upstream from of metering valve 118.

Figure 2:
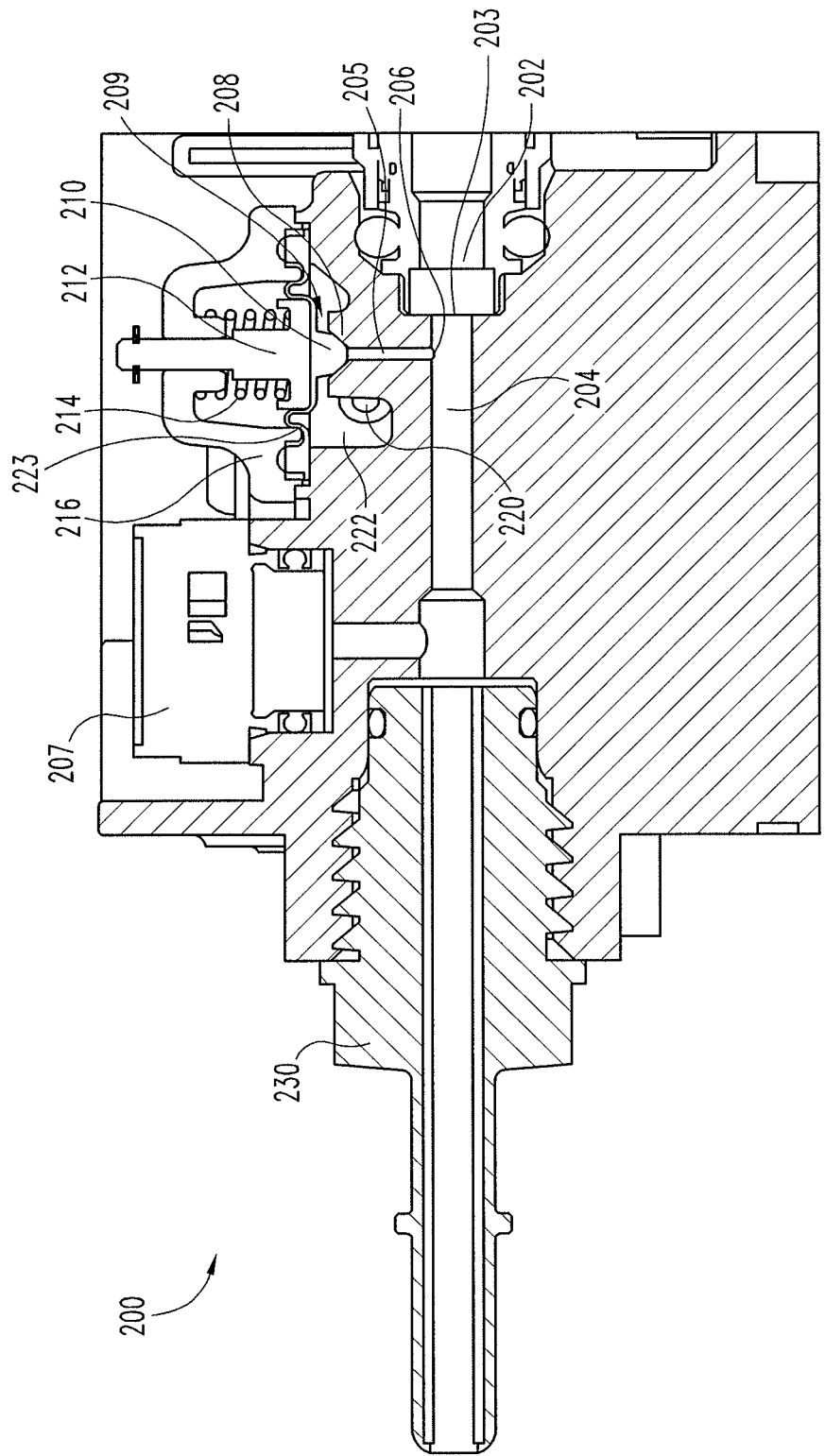
FIG. 2 is a sectional view of a portion of an exemplary air-assisted urea injection system.

With reference to FIG. 2 there is illustrated an exemplary blending device 200 which is operable to output a combined flow of urea solution and pressurized air. Blending device 200 includes a metering valve 202 having an outlet 203 which provides urea solution to a blending chamber 204. Metering valve can be controlled by controller 101 to provide urea solution at a controlled rate in a controlled amount. Blending chamber 204 also receives a flow of pressurized air from air passage 205 which extends from an outlet 206 to a seating surface 208. The flow of pressurized air through air passage 205 is controlled to have a velocity and flow characteristics effective to provide an air curtain which resists crystal formation and migration. In the illustrated form, blending chamber 204 is a substantially cylindrical passage which is configured so that urea received from metering valve 202 is entrained in a flow of pressurized air received from air passage 205, and a combined flow of pressurized air and urea solution is provided to outlet member 230 which is connected to an injector configured to provide the combined flow to an exhaust aftertreatment system. Pressure sensor 207 is operable to sense the pressure of the blended flow at a location downstream from urea outlet 203 and air outlet 206.

The flow of pressurized air to air passage 205 is controlled by operation of check valve 209 and an upstream air shut off valve. Check valve 209 includes a closing member 210 which extends from a flexible diaphragm 223 in a direction toward a seating surface 208. In FIG. 2 closing member 210 is illustrated in a closed position in which it contacts seating surface 208 to form a seal and prevent flow from air supply passage 222 to air supply passage 205. Biasing member 214 applies forge to plunger 212 which applies force to closing member 210 to maintain check valve 209 in the closed position. Biasing member 214 is illustrated in the form of a spring but may be a variety of other biasing members operable to provide force to closing member 210 in a direction toward seating surface 208. Valve cover 216 contacts biasing member 214 and holds it in position relative to plunger 212. Valve cover 216 also contacts diaphragm 223 and secures it to the underlying structure of blending device 200.

The lower surface the diaphragm 223 is exposed to air supply passage 222 which receives pressurized air from air inlet 220. The pressurized air in air supply passage 222 provides a force against the portions of the lower surface of diaphragm 223 and closing member 210 in contact with air supply passage 222. This force opposes the force applied to closing member 210 by plunger 212 and biasing member 214. When the force provided by pressurized air in air supply passage 222 is greater than the force provided by biasing member 214 check valve 209 opens and pressurized air flows from air supply passage 222 past check valve 209 to air passage 205. The opening/closing threshold pressure is established by the pre-loading of biasing member 214. The pre-loading of biasing member 214 is preferably tuned to provide rapid opening of check valve 209 at a pressure at or near a threshold pressure. The threshold pressure is preferably selected to be at or near the normal operating air pressure during urea injection, for example, 90% or more of the normal operating air pressure. This allows check valve 209 to open only when there is sufficient pressure for injection.

The threshold air pressure is also preferably selected so that check valve 209 opens only at or above a threshold air pressure which provides air flow characteristics effective to inhibit urea crystal growth in air supply passage 205 and urea crystal migration toward closing member 210. The inventors have determined that for the illustrated embodiment an air flow velocity in air supply passage 205 of at least 47 m/sec. is effective to inhibit urea crystal growth in air supply passage 205. The threshold air pressure may be selected to provide a margin of error on the minimum air flow rate, for example, the pressure may be selected to provide air flow velocity in air supply passage 205 of at least 50-55 m/sec. It should be appreciated, however, that the threshold air pressure should not exceed a magnitude where it would provides undesired air flow characteristics.

It shall be appreciated that the magnitude the threshold air pressure and associated air flow velocity effective to inhibit urea crystal growth may vary depending upon the characteristics of air supply passage 205, check valve 209 and blending chamber 204. In the illustrated embodiment air passage 205 extends over a length of about 6 mm and has a substantially constant diameter of about 1 mm. For this configuration a pressure of 3.45 bar gauge +/−0.4 bar gauge or greater has been determined to provide desired air flow characteristics effective to inhibit urea crystal growth. Additional embodiments include air supply passages with different characteristics and have different threshold air pressure values and associated air flow velocities effective to inhibit urea crystal growth.

Figure 3:
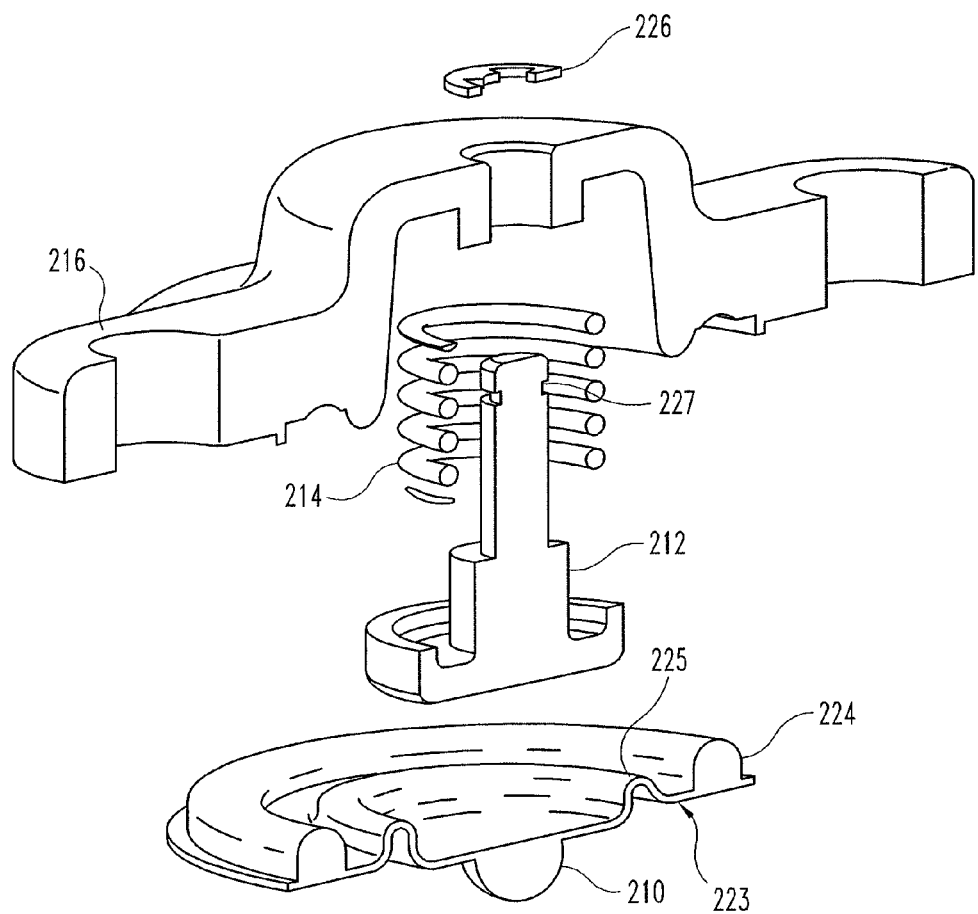
FIG. 3 is an exploded, perspective, sectional view of certain components illustrated in FIG. 2.

With reference to FIG. 3 there is illustrated an exploded sectional view of certain components illustrated in FIG. 2. Flexible diaphragm 223 includes a fold 225 that accommodates flexing to move closing member 210 and provides an alignment feature for plunger 212. Flexible diaphragm further includes a peripheral ridge 224 which is contacted by housing to retain diaphragm 223 in position and provides an alignment feature for the housing 216 relative to the diaphragm 223. A retaining clip 226 engages a groove 227 on plunger 214 to retain plunger and biasing member in place relative to housing 216. FIG. 3 illustrates closing member 210 in the form of a ball shaped or spheroid protrusion from diaphragm 223. It shall be understood that additional embodiments include closing members in various other configurations, forms and shapes.

Figure 4A:
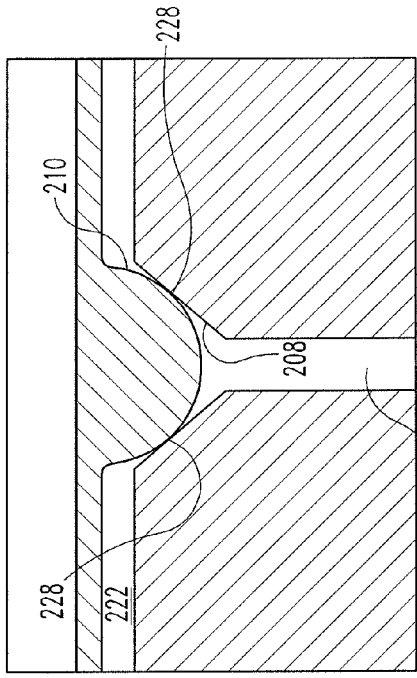
FIGS. 4A-4D are sectional views of certain components illustrated in FIGS. 2 and 3 at different points during a valve closing event.
Figure 4B:
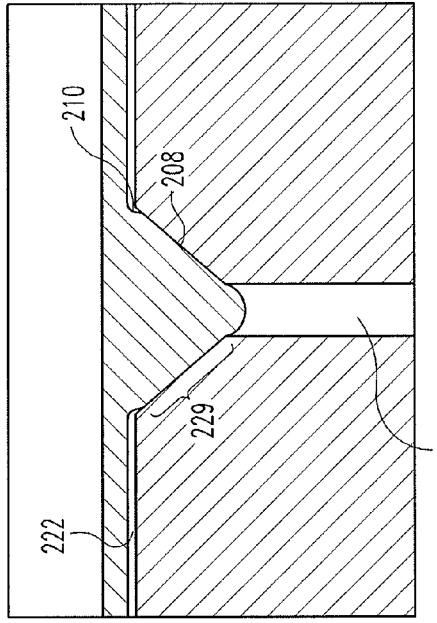
Figure 4C:
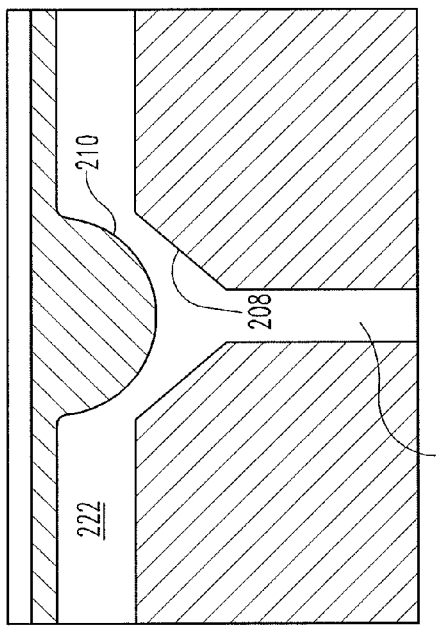
Figure 4D:
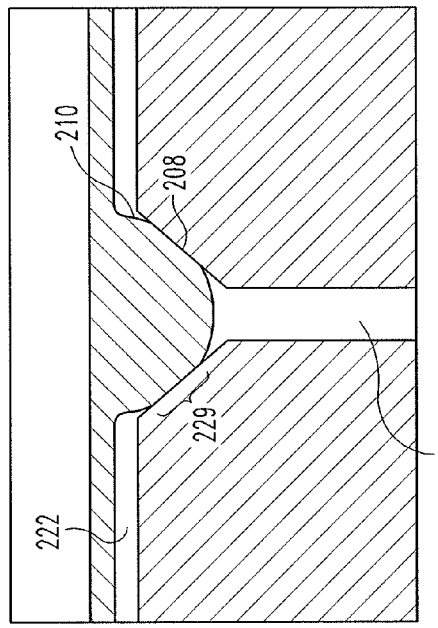

With reference to FIGS. 4A-4D there are illustrated detailed views of closing member 210 in various positions relative to seating surface 208 which illustrate the movement and deformation of closing member 210 during closing of valve 209. FIG. 4A illustrates closing member 210 in an open position relative to seating surface 208. In the open position pressurized air is permitted to flow from air supply passage 222 between valve closing member 210 and seating surface 208 and to air passage 205. FIG. 4B illustrates valve closing member 210 at the point during a valve closing event where valve closing member 210 first contacts seating surface 208 at location 228. FIG. 4C illustrates valve closing member 210 at a later point in the valve closing event. At this point valve closing member 210 has traveled across seating surface 208 effective to wipe an area 229 of seating surface 208. During valve closing the closing member 210 slides across seating surface 208 and also elastomerically deforms to conform to the shape of seating surface 208. FIG. 4D illustrates valve closing member 210 in a fully closed position. Valve closing member 210 has slid across and wiped additional area 230 of seating surface 208.

The interaction of closing member 210 with seating surface 208 provides a self-cleaning capability for check valve 209. The sliding and wiping motion of closing member 210 across seating surface 208 is preferably effective to dislodge and wipe away urea crystals from seating surface 208. The portion of closing member 210 that contacts seating surface 208 preferably has a hardness of 50-70 Shore A to allow sufficient elastomeric deformation but provide sufficient hardness to dislodge and wipe urea crystals from surface 208. It shall be appreciated that other embodiments include closing members with different material properties that achieve a sliding and wiping of a seating surface with sufficient force to dislodge and wipe urea crystals from the seating surface.

Figure 5:
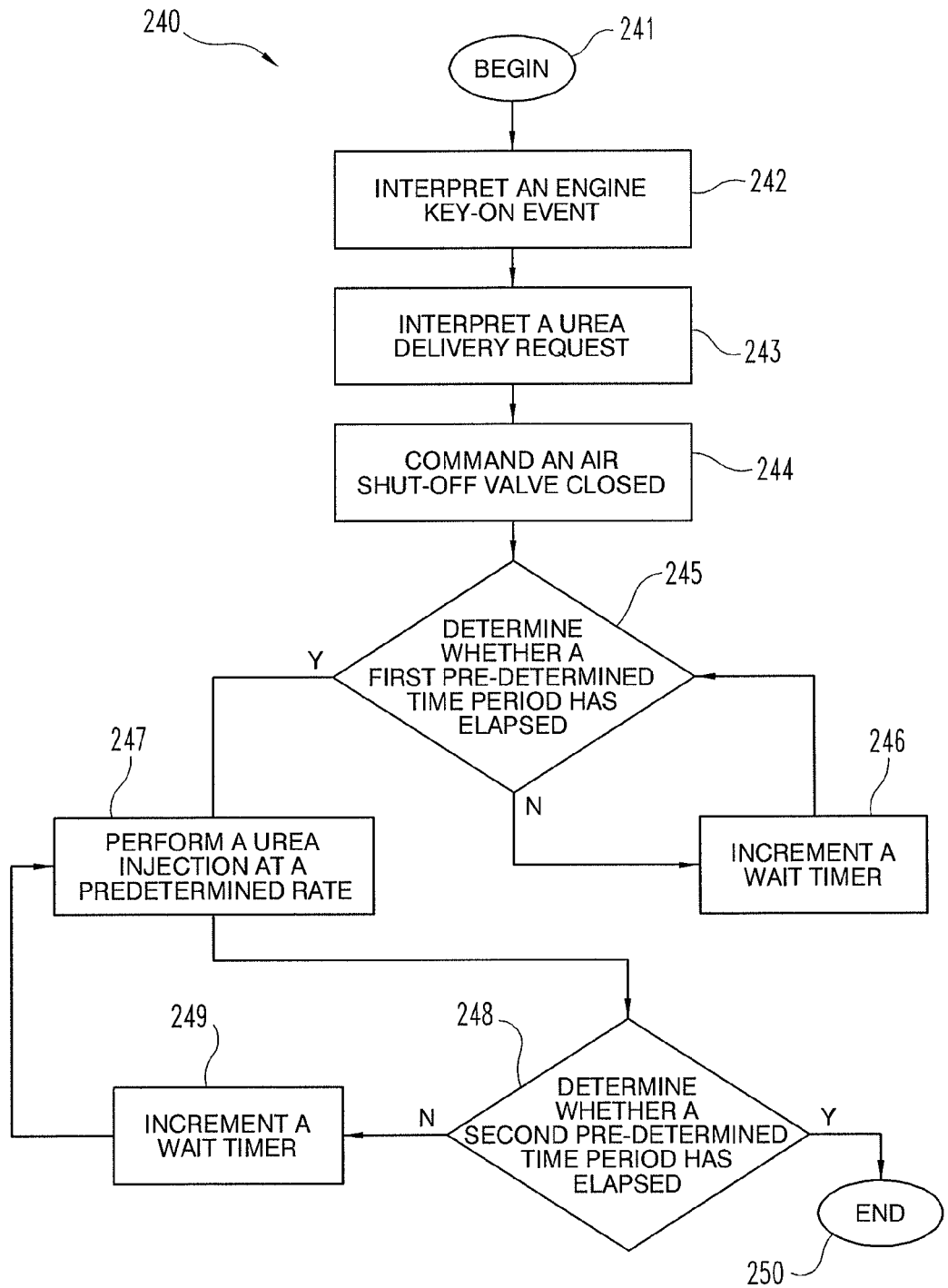
FIGS. 5-8 are flow diagrams of urea injection system control procedures.

With reference to FIG. 5 there is illustrated a flow diagram of a wash cycle procedure 240 for a of a urea injection system. Procedure 240 begins at operation 241 in which a control routine for a urea injection system for an SCR exhaust aftertreatment system is initiated. From operation 241, procedure 240 proceeds to operation 242 which interprets an engine key-on event. The operation to interpret an engine key-on event may include, additionally or alternatively, interpreting a communication or other parameter indicating that operations of the fluid injector are going to resume after a shutdown, or after a period of inactivity of a specified length that may not include a complete shutdown. If an engine system key-on event is interpreted to be true, procedure 240 proceeds to operation 243. If an engine system key-on event is interpreted to be false, operation 241 repeats.

Operation 243 interprets a urea delivery request. The operation to interpret the urea delivery request includes a determination that urea injection for exhaust aftertreatment has been commanded or requested or that actual usage of the fluid injector is imminent. In certain embodiments, a command for the fluid injector to inject urea serves as the urea delivery request. If a urea delivery request is determined to be greater than zero, procedure 240 proceeds to operation 244. If a urea delivery request is not determined to be greater than zero, operation 243 repeats.

Operation 244 commands an air shut off valve to close. The shut off valve may be, for example, valve 106 which is illustrated and described above in connection with FIG. 1. From operation 244 procedure 240 proceeds to timer evaluation 245. Timer evaluation 245 is configured to evaluate whether a first predetermined time has elapsed. The first predetermined time is selected to ensure that an air flow passage has been sealed to prevent urea solution from flowing past the seal. In certain embodiments timer 245 is configured to account for the time required for a check valve positioned downstream from an air shut off valve to close such as is described above in connection with FIGS. 1-4. If timer evaluation 245 determines that the first predetermined time has not elapsed procedure 240 proceeds to operation 246 which increments the timer and returns to timer evaluation 245

If timer evaluation 245 determines that the first predetermined time has elapsed procedure 240 proceeds to operation 247 which provides urea solution to a portion of the system to be washed. In certain embodiments urea is provided to a blending chamber such as blending chamber 204 illustrated and described above in connection with FIG. 2. In certain embodiments urea is provided at a rate effective to fill at least a portion of the blending chamber to dissolve or detach urea crystals which may have formed therein. In certain embodiments urea is provided at a rate effective to fill at least a portion of an air supply passage in flow communication with the blending chamber, such as air supply passage 205 illustrated and described above in connection with FIG. 2, to dissolve or urea crystals which may have formed therein. In certain embodiments urea solution is provided to substantially fill the blending chamber and the air supply passage.

From operation 247 procedure 240 proceeds to timer evaluation 248 which evaluates whether a second predetermined time period has elapsed. The second predetermined time is preferably a time that allows the urea crystals to dissolved or detach from the portion of the system provided with urea solution. The second predetermined time may be determined empirically through data sampling with a test fluid injector. In certain embodiments, the predetermined time may be a function of the urea flow rate during cleaning, the temperature of the supplied urea, a temperature of the fluid injector (e.g. from an ambient temperature or other estimate), and/or a function of the flow velocity or Reynolds number of the urea flowing within the fluid injector having a mixing passage of the given cross-section.

If timer evaluation 248 determines that the second predetermined time has not elapsed, procedure 240 proceeds to operation 249 which increments the timer and returns to operation 247. If timer evaluation 248 determines that the second predetermined time has elapsed, procedure 240 proceeds to operation 250 which ends the wash cycle. In some embodiments procedure 240 may be repeated only once during a key on cycle. In other embodiments procedure 240 may repeat periodically or after a predetermined time has lapsed. In further embodiments procedure 240 may repeat when a system obstruction condition is detected.

Certain operations described herein include operations to interpret one or more parameters. Interpreting, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a computer readable medium, receiving the value as a run-time parameter by any means known in the art, and/or by receiving a value by which the interpreted parameter can be calculated, and/or by referencing a default value that is interpreted to be the parameter value.

Figure 6:
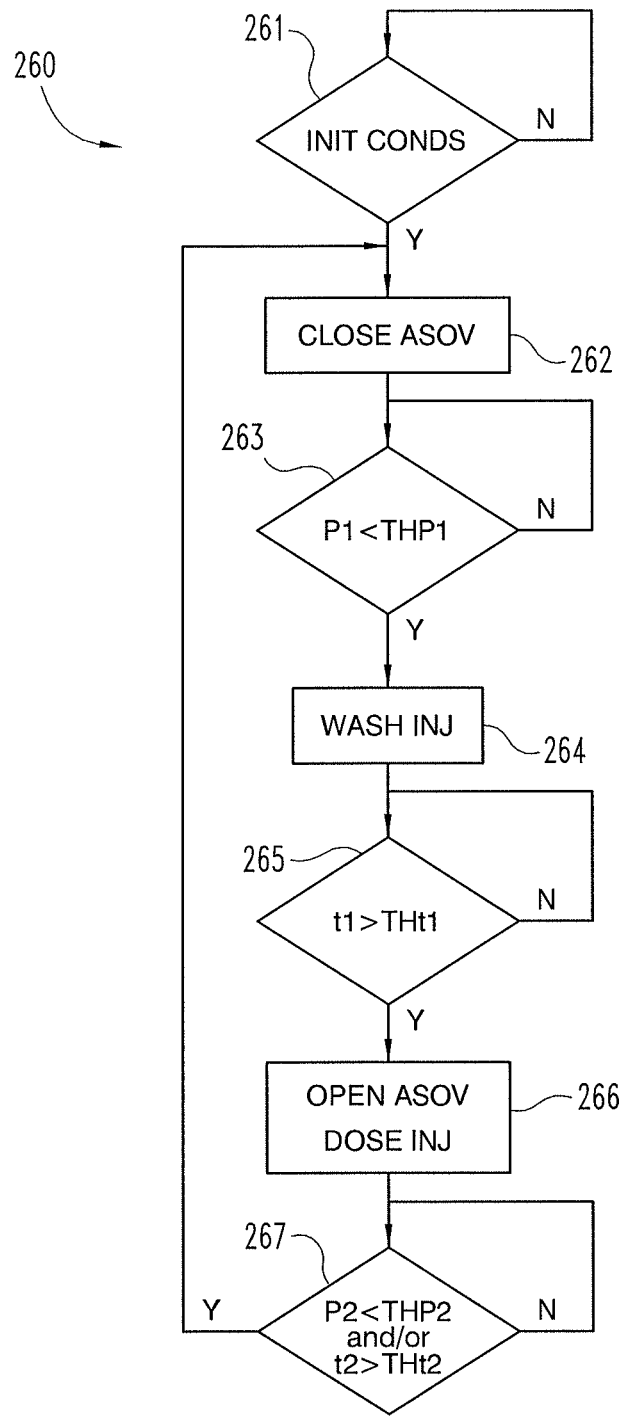

With reference to FIG. 6 there is illustrated a flow diagram according to a further exemplary wash cycle procedure 260 for a urea injection system. Procedure 260 begins at conditional 261 which evaluates one or more initialization conditions. In certain embodiments the initialization conditions include evaluating whether a key-on value is true, a urea supply request is true, and a urea pump primed pressure check is true. If conditional 261 determines that the initialization conditions are not true, it repeats the evaluation of the one or more initialization conditions. If conditional 261 determines that the initialization conditions are true, it proceeds to operation 262.

Operation 262 commands an air shut off valve to close. The air shut off valve may be, for example, air shutoff valve 106 illustrated and described above in connection with FIG. 1. From operation 262 procedure 260 proceeds to conditional 263. Conditional 263 evaluates whether pressure information P1 is less than a threshold pressure THP1. In an exemplary embodiment, pressure information P1 is provided by pressure sensor 207 which is illustrated and described above in connection with FIG. 2. In other embodiments pressure information P1 is provided by one or more pressure sensors positioned in other locations downstream from an air inlet and a urea inlet to a blending chamber. Threshold THP1 is a threshold pressure identifying that a valve has closed to prevent the flow of pressurized air through a an air supply passage leading to the blending chamber. In an exemplary embodiment, threshold THP1 is selected to indicate that check valve 209 has closed based upon an expected pressure value such as atmospheric pressure or a value greater than atmospheric pressure accounting for pressure seen at the outlet of the injection system such as 130 kPa. If conditional 263 is false it repeats the evaluation. If conditional 263 is true it proceeds to operation 264.

Operation 264 performs a wash injection of urea solution into a blending chamber with an air shut off valve closed. In certain embodiments urea is provided to a blending chamber such as blending chamber 204 illustrated and described above in connection with FIG. 2. In certain embodiments urea is provided at a rate effective to fill at least a portion of the blending chamber to dissolve or detach urea crystals which may have formed therein. In certain embodiments urea is provided at a rate effective to fill at least a portion of an air supply passage in flow communication with the blending chamber, such as air supply passage 205 illustrated and described above in connection with FIG. 2, to dissolve or urea crystals which may have formed therein. In certain embodiments urea solution is provided to substantially fill the blending chamber and the air supply passage.

From operation 264 procedure 260 proceeds to conditional 265. Conditional 265 is a timer which tests whether an elapsed time t1 is greater than a time threshold THt1. The time threshold THt1 is selected to allow the urea crystals to dissolved or detach from the portion of the system provided with urea solution. The time threshold THt1 may be determined empirically through data sampling with a test fluid injector. In certain embodiments, the time threshold THt1 may be a function of the urea flow rate during cleaning, the temperature of the supplied urea, a temperature of the fluid injector (e.g. from an ambient temperature or other estimate), and/or a function of the flow velocity or Reynolds number of the urea flowing within the fluid injector having a mixing passage of the given cross-section. If conditional 265 is false, it repeats. If conditional 265 is true, it proceeds to operation 266.

Operation 266 opens the air shutoff valve and returns control of urea dosing to a control routine that provides urea solution at a rate needed for the SCR catalyst to reduce NOx generated by the engine which may be referred to as normal urea dosing operation. From operation 266, procedure 260 proceeds to conditional 267. In certain embodiments conditional 267 tests whether pressure P2 is less than a pressure threshold THP2. In certain embodiments, pressure P2 is the pressure sensed by pressure sensor 207 which is illustrated and described above in connection with FIG. 2, and pressure threshold THP2 is a threshold which indicates a blockage upstream from pressure sensor 207 such as can occur through the accumulation or growth of urea crystals in blending chamber 204. In certain embodiments conditional 267 also implements a timer which tests whether a time t2 is greater than a time threshold THt2 which indicates a minimum delay between sequential wash cycles. In certain embodiments conditional 267 evaluates whether either pressure P2 is less than pressure threshold THP2 or whether time t2 is greater than time threshold THt2. In certain embodiments conditional 267 evaluates whether both pressure P2 is less than pressure threshold THP2 and time t2 is greater than time threshold THt2. If conditional 267 is false, it repeats. If conditional 267 is true, it proceeds to operation 262.

Figure 7A:
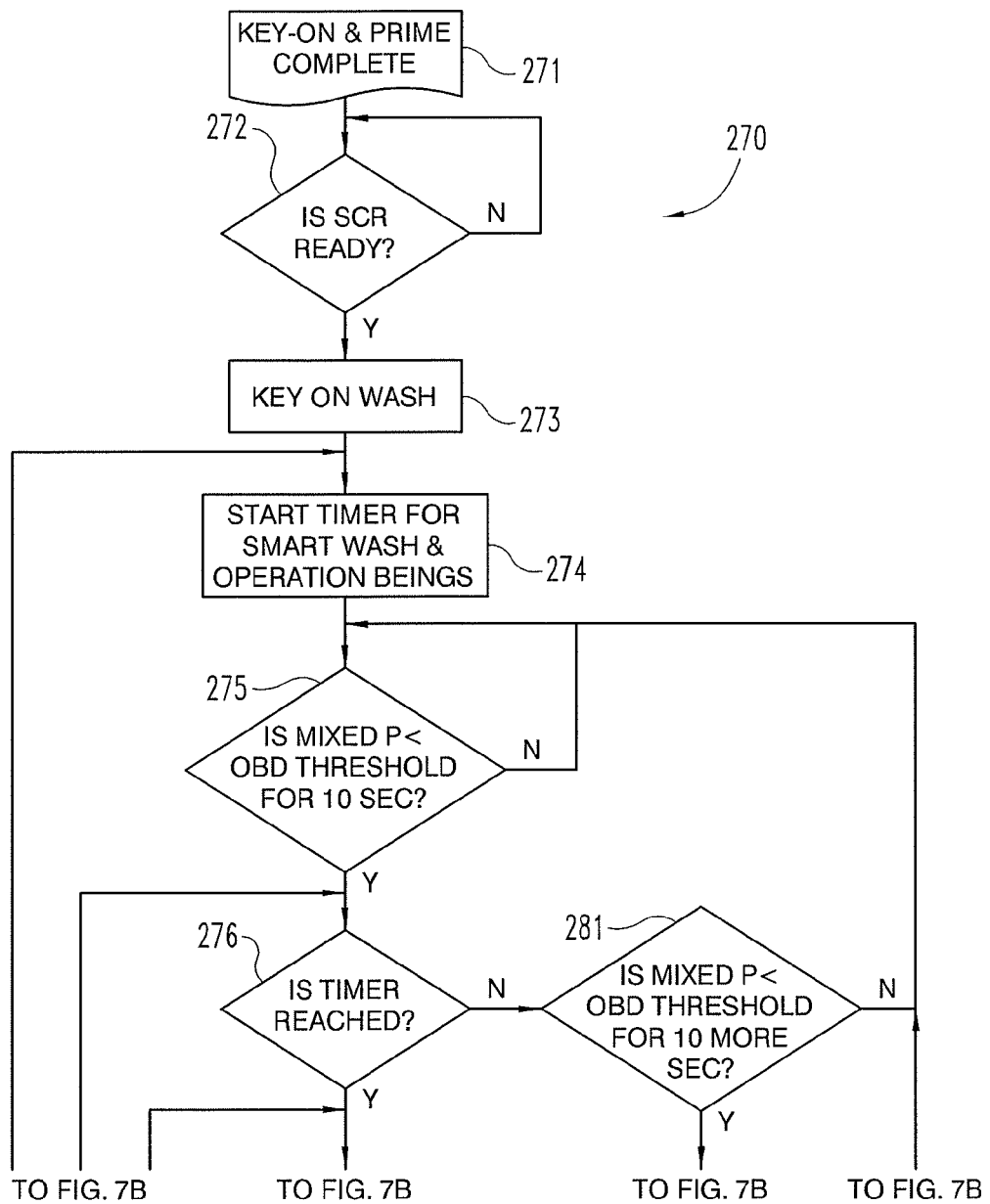
Figure 7B:
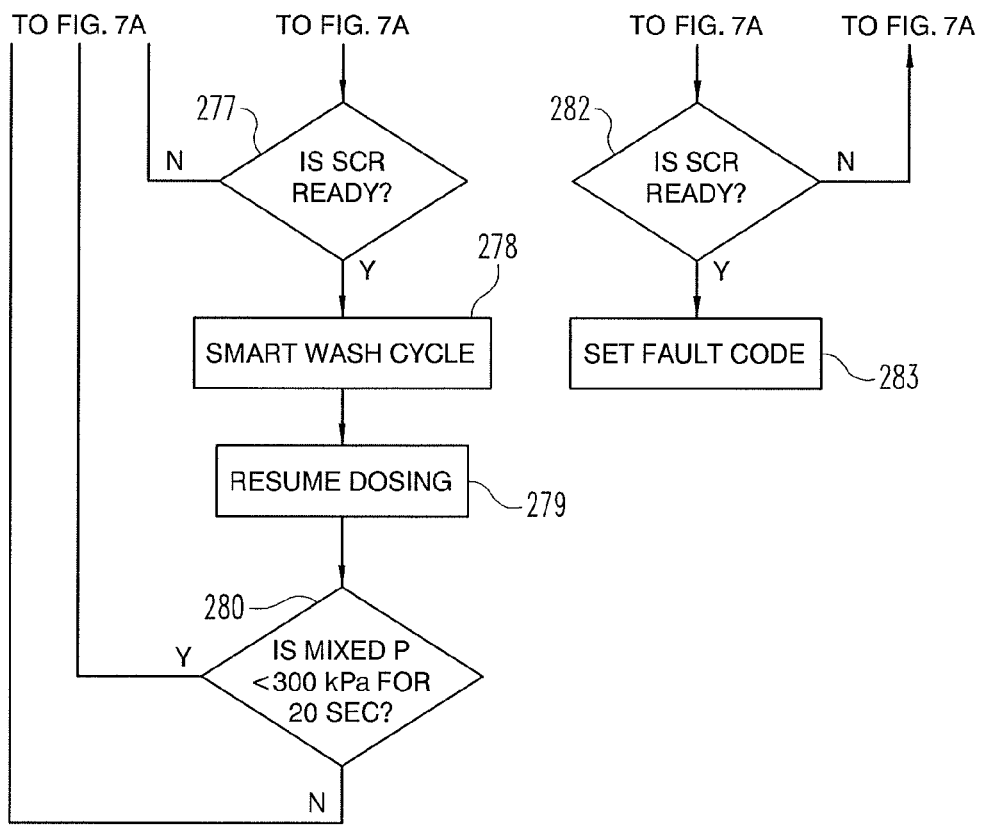

With reference to FIGS. 7A and 7B there is illustrated a flow diagram according to an exemplary wash cycle process 270 for a urea injection system which may be, for example, a system as illustrated and described in connection with FIGS. 1-4 or another system. Process 270 begins an conditional 271 which evaluates whether initialization conditions are true. In the illustrated embodiment the initialization condition evaluation includes evaluating whether a key on condition is true indicating that an operator has turned a vehicle key on, and evaluating whether a urea pump prime complete condition is true indicating that a urea solution pump has successfully primed to provide urea solution pressure above an operation threshold, for example, urea solution pressure above 420 kPa. If the initialization conditions are not true conditional 271 repeats. If the initialization conditions are true process 270 proceeds to conditional 272.

Conditional 272 evaluates whether an SCR system is ready. A number of criteria may be utilized to evaluate whether the SCR system is ready. In certain embodiments conditional 272 evaluates whether an SCR catalyst inlet temperature is within a predetermined temperature range, for example between 200° C. and 600° C., evaluates whether an SCR catalyst bed temperature is within a predetermined range, for example between 180° C. and 600° C., and evaluates whether an exhaust mass flow is above a predetermined value, for example, above 30 grams per second. These evaluations are effective to evaluate temperature and exhaust flow conditions associated with an injector nozzle that provides urea solution to an exhaust flowpath of the SCR system are in a range acceptable to avoid nozzle blockage due to insufficient temperature, excessive temperature, or insufficient exhaust flow. Additional embodiments utilize other criteria for determining whether the SCR system is ready including, for example, alternate temperature ranges, alternate flow rates, temperature measurements at alternate locations such as at or near the injector nozzle or a conduit in which the injector nozzle is disposed, exhaust temperature measurements, measurements by virtual sensors instead of or in addition physical sensors, as well as other criteria relating to SCR catalyst conditions, engine operation, and exhaust output of the engine. Certain embodiments evaluate whether the SCR system is ready based upon a receipt of a urea dosing command which is generated only when a separate routine has determined that the SCR system is ready and dosing can occur.

If conditional 272 determines that the SCR system is not ready, it repeats. If conditional 272 determines that the SCR system is ready, process 270 proceeds to operation 273 which performs a wash cycle which is illustrated and described in connection with FIG. 8. Operation 273 may also perform other wash cycle operations such as those described in connection with FIGS. 5 and 6. From operation 273 process 270 proceeds to operation 274 which starts a smart wash timer and initiates operation of a urea dosing system to provide urea solution at a rate needed for the SCR catalyst to reduce NOx generated by the engine which may be referred to as normal urea dosing operation.

From operation 274 process 270 proceeds to conditional 275 which evaluates whether the pressure of a combined flow of pressurized gas and urea is below a wash cycle threshold for a predetermined time, for example, less than 310 kPa for 10 seconds. If conditional 275 determines that the pressure of the combined flow is not less than the wash cycle threshold, it repeats. If conditional 275 determines that the pressure of the combined flow is below the wash cycle threshold for the predetermined time, process 270 proceeds to conditional 276. Alternatively, in certain embodiments, if conditional 275 determines that the pressure of the combined flow is below the wash cycle threshold for the predetermined time, process 270 evaluates whether temperature of an SCR catalyst is below a threshold, for example, 400° C. If the temperature is at or below the threshold, process 270 proceeds to conditional 276. If the temperature is above the threshold, process 270 proceeds to conditional 281.

Conditional 276 evaluates whether the smart timer has reached a predetermined time limit. The predetermined time is selected to ensures that a wash cycle is not performed too frequently so as to negatively impact NOx conversion efficiency to an undesired or unacceptable degree or crate an undesirable or unacceptable increase the risk of injection nozzle blockage by urea deposits. If conditional 276 determines that the time limit has not been reached, it repeats. If conditional 276 determines that the time limit has been reached, process 270 proceeds to conditional 281.

Conditional 281 evaluates whether a pressure of the combined flow of compressed gas and urea is less than an on-board diagnostic (OBD) threshold for predetermined time, for example, below 300 kPa for 10 seconds. If conditional 281 determines that the pressure of the combined flow is not below the diagnostic threshold for the predetermined time, process 270 returns to conditional 275. If conditional 281 determines that the pressure of the combined flow is above the diagnostic threshold for the predetermined time, process 270 proceeds to conditional 282.

Conditional 282 evaluates whether the SCR system is ready, for example, using the criteria described above in connection with conditional 272, or other criteria indicating performance or operation of an SCR catalyst. If conditional 282 determines that the SCR system is not ready for operation, process 270 returns to conditional 275. If procedure 282 determines that the SCR system is ready for operation, process 270 proceeds to operation 283 which sets a low pressure fault code which may indicate any of several failure modes including, insufficient pressure in an air supply tank due to a leak or a compressor malfunction, air shut-off valve malfunction preventing the valve from opening, air supply line blockage or leaks, urea crystallization obstruction or air flow, or other leaks, blockages or component failures associates with the air supply system. Certain embodiments may omit conditional 282 and proceed from conditional 281 to operation 283.

If conditional 276 determines that the smart wash timer has reached the predetermined time threshold, process 270 proceeds to operation 277 which evaluates whether the SCR system is ready for operation, for example, as described in connection with conditional 272, or by evaluating whether criteria indicating that the SCR aftertreatment system is ready for operation. If conditional 277 determines that the SCR system is not ready, it repeats. If conditional 277 determines that the SCR system is ready for operation, process 270 proceeds to operation 278.

Operation 278 performs a wash cycle which is illustrated and described in connection with FIG. 8. Operation 273 may also perform other wash cycle operations such as those described in connection with FIGS. 5 and 6. From operation 278 process 270 proceeds to operation 279. Operation 279 resumes normal dosing operation of the urea injection system. From operation 279 process 270 proceeds to conditional 280 which evaluates whether a pressure of the combined flow of urea solution and compressed gas is below a wash cycle threshold for a predetermined time, for example, less than 300 kPa for 20 seconds, less than 310 kPa for 20 seconds, or another predetermined time or pressure value. If conditional 280 determines that the pressure of the combined flow is not below the predetermined pressure for the predetermined time, process 270 proceeds to operation 274 if conditional 280 determines that the pressure of the combined flow is below the predetermined pressure for the predetermined time, process 270 proceeds to conditional 276.

Figure 8:
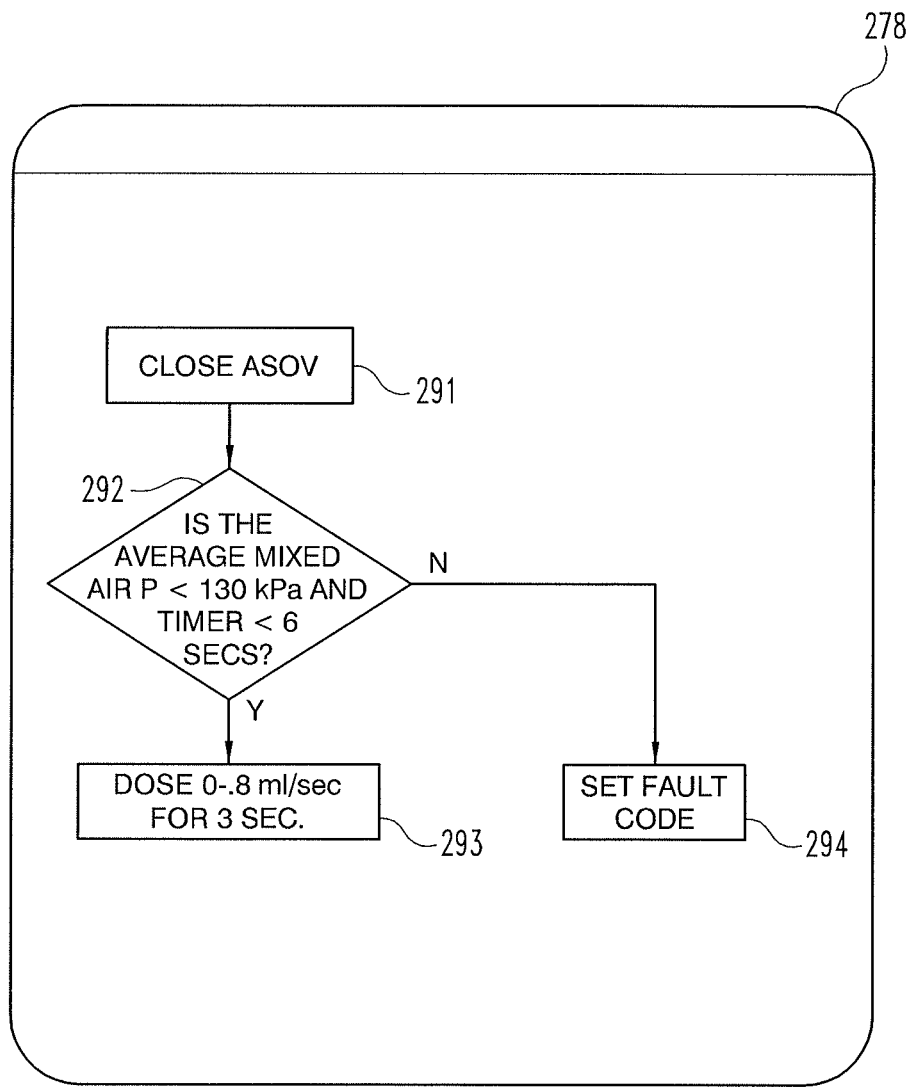

With reference to FIG. 8, there is illustrated a flow diagram according to an exemplary wash cycle 273. Wash cycle 273 begins with operation 291 which closes an air shutoff valve and interrupts normal dosing operation to stop supplying urea solution. From operation 291 wash cycle 273 proceeds to conditional 292. Conditional 292 evaluates whether an average pressure of a flow compressed gas is less than the predetermined pressure, for example 130 kPa or another predetermined pressure, and whether a timer is less than a predetermined time, for example less than 6 seconds or another predetermined time. If conditional 292 determines that the pressure of the combined flow is below the predetermined threshold and the timer is below the time threshold, wash cycle 273 proceeds to operation 292 which provides urea solution to a dosing system component such as a blending chamber at a predetermined rate for a predetermined time, for example, 0.8 ml per second for 3 seconds, 0.6 ml per second for 4 seconds, or another rate for another time effective to dissolve or detach urea crystals from the blending chamber or other portions of a urea solution injection system.

If conditional 292 determines that the pressure of the combined flow is not below the predetermined pressure or the timer is not less than the predetermined time, or both, wash cycle 278 proceeds to operation 294 which sets a fault code indicating a blocked injection nozzle. In certain embodiments, if conditional 292 determines that the pressure of the combined flow is not below the predetermined pressure or the timer is not less than the predetermined time, or both, wash cycle 273 waits a predetermined time, for example, 6 seconds, and proceeds to a conditional which evaluates whether an average pressure of a flow compressed gas is less than a second predetermined pressure threshold which may be the same as or different from the predetermined pressure of conditional 292, for example 130 kPa, 150 kPa, or another predetermined pressure. If it is determined that the pressure is at or below the second threshold, wash cycle 273 proceeds to operation 292. If it is determined that the pressure is above the second threshold wash cycle 278 proceeds to operation 294.

In certain embodiments operation 292 provides urea to a blending chamber such as blending chamber 204 illustrated and described above in connection with FIG. 2. In certain embodiments urea is provided at a rate effective to fill at least a portion of the blending chamber to dissolve or detach urea crystals which may have formed therein. In certain embodiments urea is provided at a rate effective to fill at least a portion of an air supply passage in flow communication with the blending chamber, such as air supply passage 205 illustrated and described above in connection with FIG. 2, to dissolve or urea crystals which may have formed therein. In certain embodiments urea solution is provided to substantially fill the blending chamber and the air supply passage.

In certain embodiments wash cycle 273 may also perform a metering valve blockage diagnostic during operation 292. During operation 292 urea pressure upstream from a urea metering valve is monitored. If a predetermined pressure drop is not observed, a fault code is set to indicate a metering valve blockage. Otherwise wash cycle 273 proceeds as described above. The metering valve blockage diagnostic may be performed during each wash cycle or only during the first wash cycle initiated after a key on event.

Figure 9:
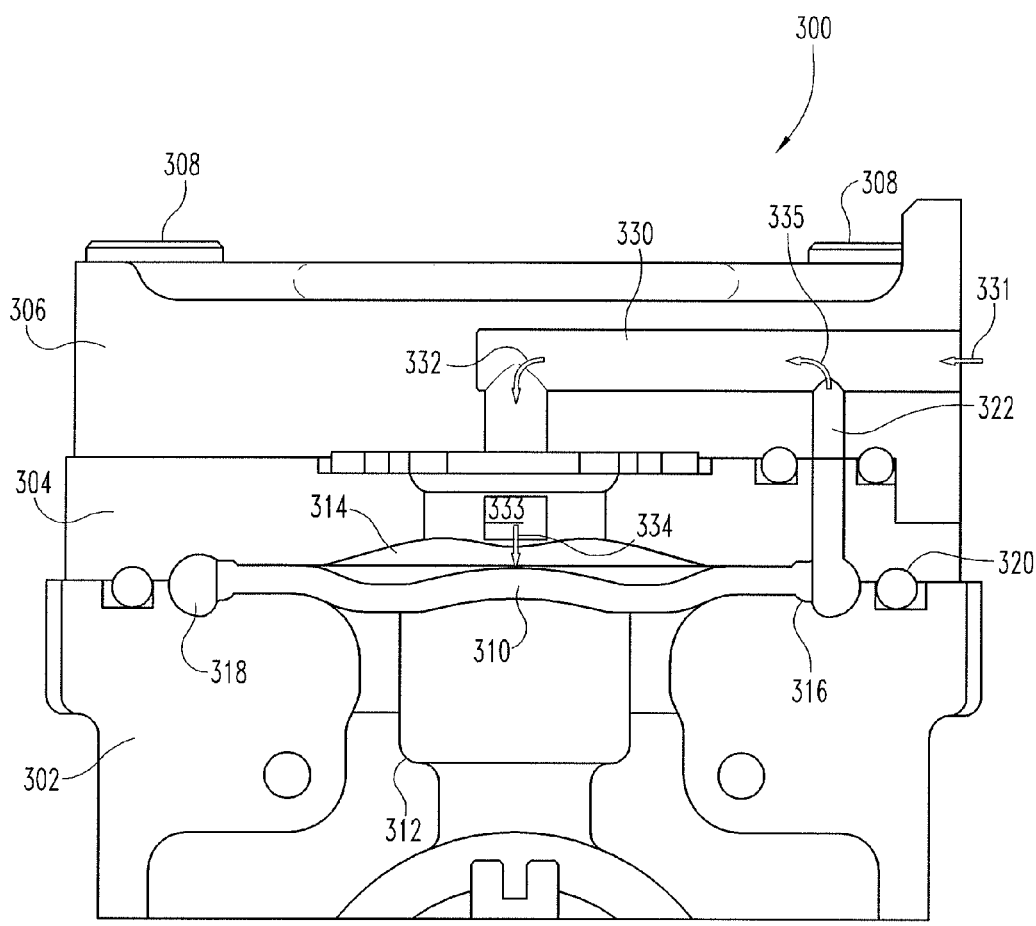
FIG. 9 is a side sectional view of an exemplary pump unit of a urea injection system.

With reference to FIG. 9, there is illustrated an exemplary pump 300 for an exhaust aftertreatment urea injection system. Pump 300 includes a pump body 302, a pump bonnet 304 and a pump head 306 which are coupled with threaded fasteners 308. A flexible diaphragm is clamped between pump bonnet 304 and pump body 302 at a peripheral region of the diaphragm 310. A surface of diaphragm 310 faces and defines a boundary of a compression chamber 314. A seal is formed in the peripheral region where diaphragm 310 is clamped between pump bonnet 304 and pump body 302. A diaphragm bead 316 positioned at the peripheral region of diaphragm 310 contributes to the formation of the seal. An annular collection chamber 318 surrounds the seal formed where pump bonnet 304 and pump body 302 clamp diaphragm 310. The collection chamber 318 is sealed from the ambient environment by an sealing member 320 which in the illustrated embodiment is an O-ring positioned between and clamped by pump bonnet 304 and pump body 302 surrounding collection chamber 318. An actuator 312 is coupled with diaphragm 310 and is operable to move diaphragm 310 to vary the volume of compression chamber 314.

During operation of pump 300 the actuator 312 drives the diaphragm 310 to alternately expand and contract the volume of compression chamber 314. This operation creates a suction force at the pump inlet which draws urea solution from a urea supply source in the directions indicated by arrows 331, 332 and 334 through inlet flow path 330. Urea solution is drawn through a check valve 333 which allows flow from flow path 330 to chamber 314 but prevents flow in the opposite direction. While not illustrated, it should be understood that pump 300 also includes an outlet flow path in flow communication with chamber 314 and a second check valve that permits flow of pressurized urea solution from chamber 314 to the outlet flow path but not in the opposite direction. During operation of pump 300 pressurized urea solution is provided to the pump outlet.

During compression stroke actuator 312 moves diaphragm 310 to reduce the volume of chamber 314. During the compression stroke the pressure of urea solution within chamber 314 may be sufficiently great so as to cause leakage through the seal formed by pump bonnet 304 and pump body 302 clamping diaphragm 310. Solution that leaks past the seal is captured by collection chamber 316. Suction generated by the operation of pump 300 draws urea solution that is leaked into collection chamber 318 through return passage 322 and into inlet passage 330 where it returns to the inlet of chamber 314. During operation of pump 300, chamber 314 and return passage 322 are under substantially continuous suction. Thus, even if the seal formed by sealing member 320 is compromised, suction provided by operation of the pump 300 will draw air from the ambient environment to the pump inlet and will prevent urea solution from leaking to the ambient environment.

Figure 10:
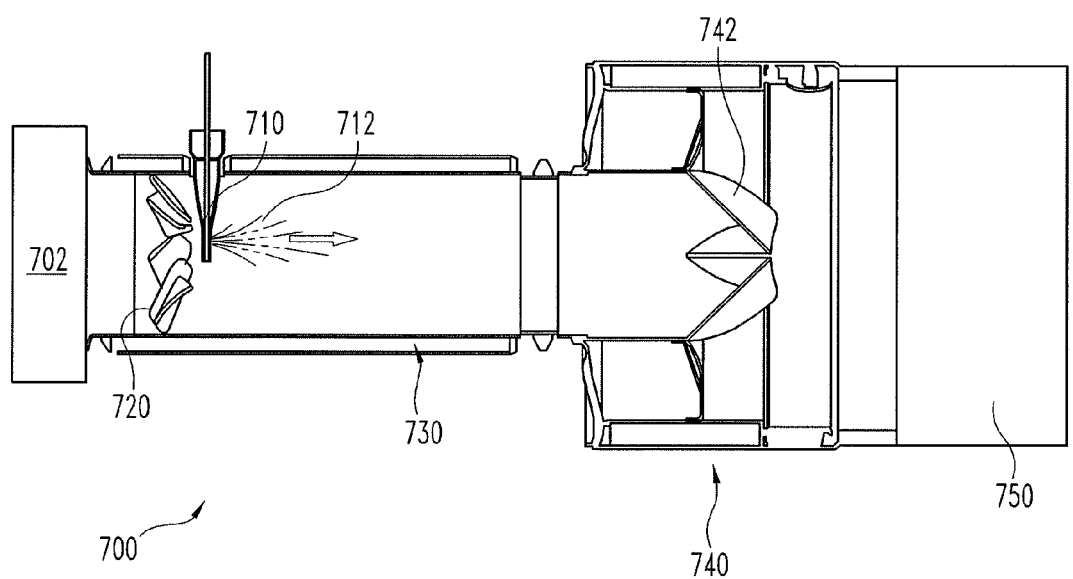
FIG. 10 is a side sectional view of an exemplary exhaust flowpath of an SCR aftertreatment system.

With reference to FIG. 10 there is illustrated an exemplary exhaust flow path 700 for an SCR aftertreatment system. Exhaust flow path 700 includes an exhaust source 702 which may be a diesel engine for example. Exhaust source 702 provides a flow of exhaust through conduit 730. A mixer 720 is disposed in the conduit 730. An injection nozzle 710 is disposed in location downstream from the mixer 720 at or about the centerline of conduit 730. The injection nozzle 710 injects urea in the direction of exhaust flow as indicated by spray 712 and the associated arrow. Spray 712 is distributed generally uniformly in the central region of flow path 730 but not distributed uniformly in the peripheral region of flow path 730. Mixer 720 imparts a swirl in exhaust flowing through the peripheral region of conduit 730 while allowing flow to continue to proceed normally through the central portion of conduit 730. In this manner exhaust back pressure is minimized by providing minimal instruction to obtain exhaust swirl only in the location where it is needed. The spray of urea solution 712 introduced into conduit 730 decomposes along the length of conduit 730 downstream from injection nozzle 710 to form ammonia. Ammonia is provided from outlet 742 to SCR catalyst 750 of catalyst unit 740 which functions to reduce emissions of NOx in the exhaust.

Figure 11:
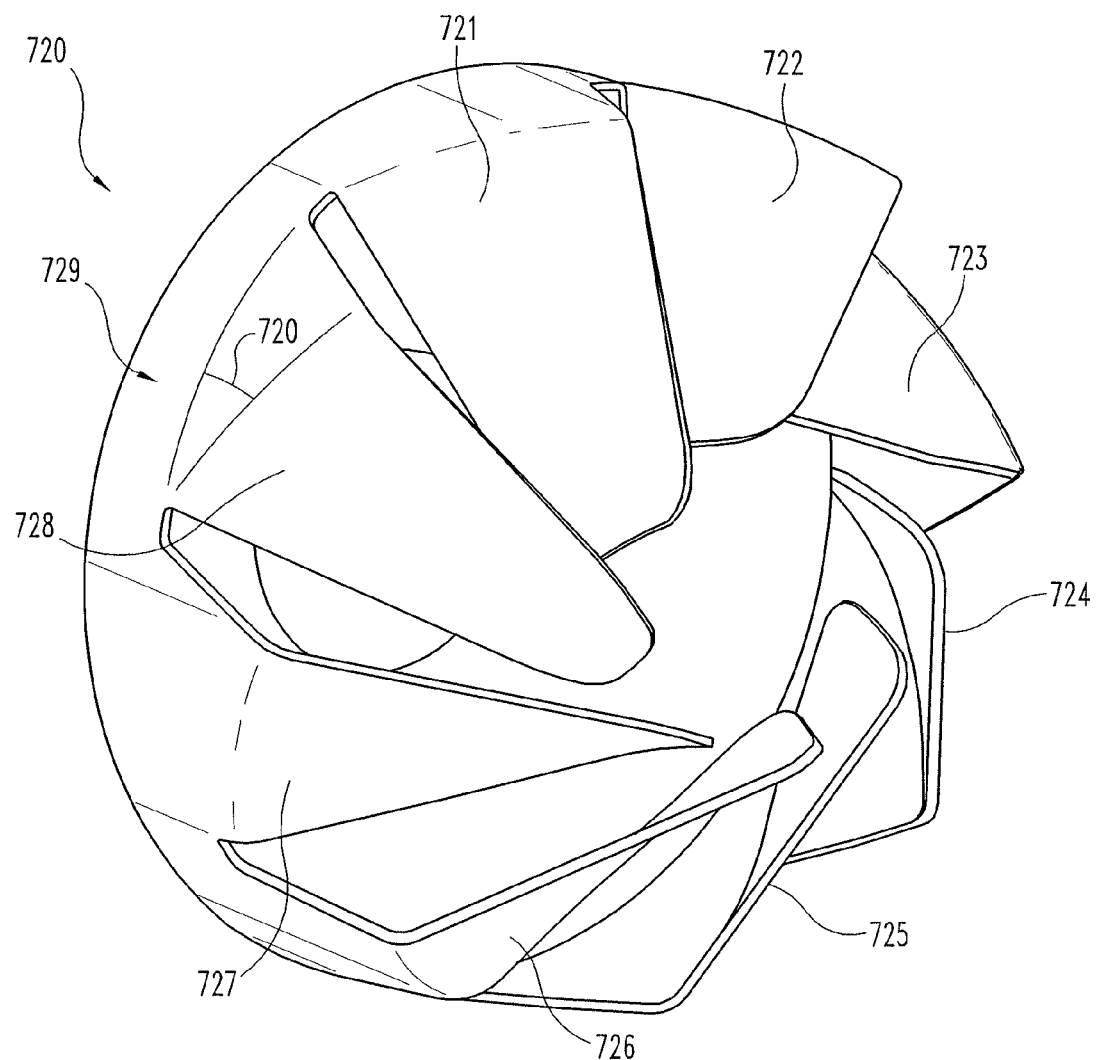
FIG. 11 is a perspective view of an exemplary mixer of an SCR aftertreatment system.

With reference to FIG. 11 there is illustrated a detailed perspective view of mixer 720. Mixer 720 includes a base portion 729 which can be attached to the interior surface of conduit 730 and a plurality of bent vanes 720-728. The central region of the mixer is open to allow flow to proceed through the mixer without encountering vanes that impart swirl. Mixer 720 can be formed from a stock sheet of metal which is cut, bent and rolled to the proper diameter to provide scalability for multiple exhaust conduit diameters. Swirl provided by mixer 740 is also scalable for a given exhaust conduit diameter by varying the number of swirl vanes and their geometries thereby reducing or increasing the delta pressure associated with the addition of mixer 740, depending on the NOx reduction desired.

Figure 12:
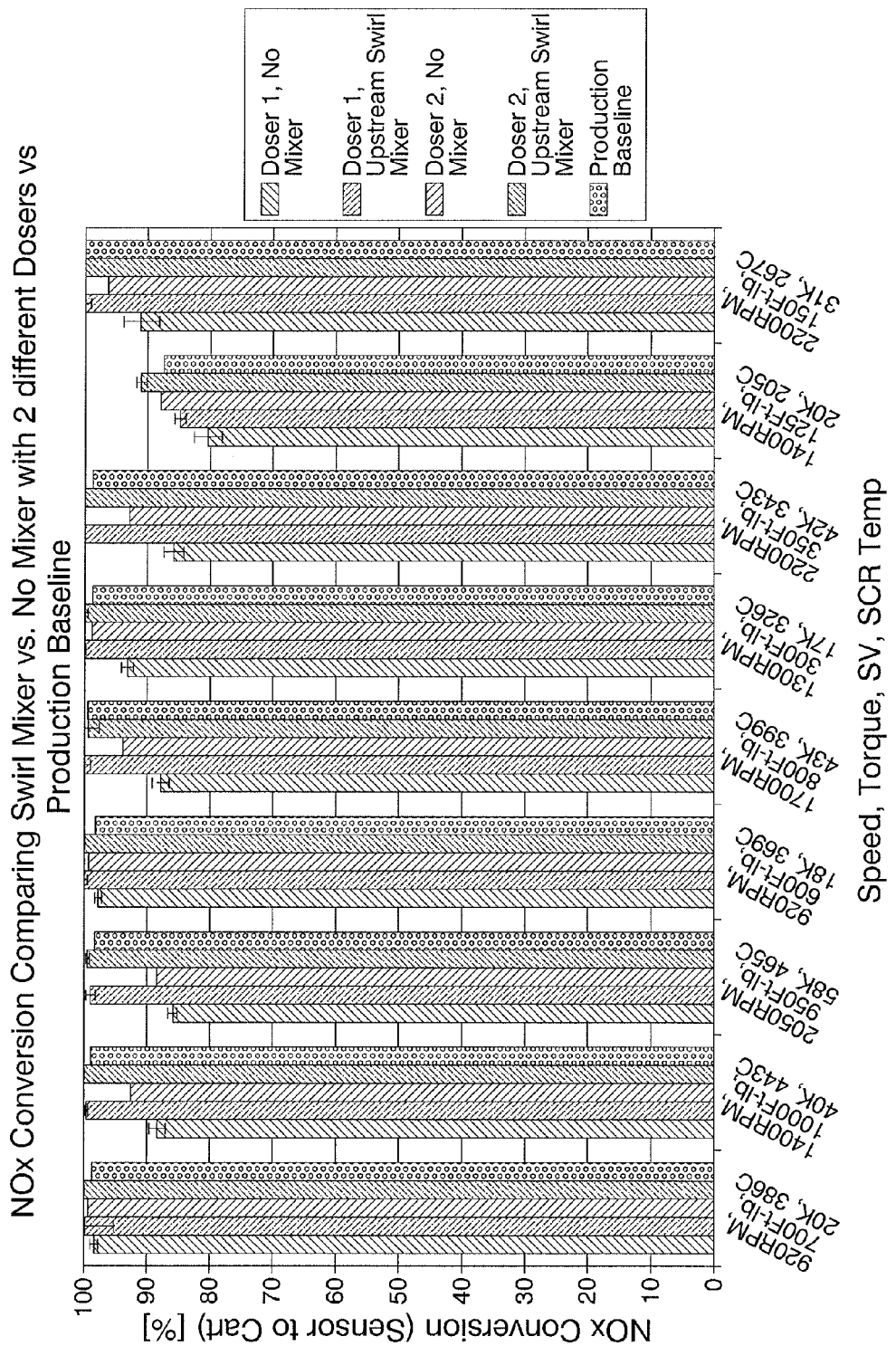
FIG. 12 is a graph illustrating percent NOx conversion by several SCR aftertreatment systems with and without mixers.

With reference to FIG. 12 there is illustrated a graph of percent NOx conversion at different engine operating conditions for two different urea dosers with and without a mixer, as well as a conventional system baseline. The data of FIG. 12 illustrates that incremental improvements in NOx conversion are observed at each operational point with the inclusion of the mixer. It is further seen from the data in FIG. 12 that greater improvements are observed at high space velocity values for the aftertreatment system utilized in the test.

Certain exemplary embodiments will now be further described. Certain exemplary embodiments comprise apparatuses for urea dosing of an exhaust aftertreatment system. Certain exemplary apparatuses comprise a chamber configured to receive pressurized gas at a first inlet, receive urea solution at a second inlet, and provide a combined flow of pressurized gas and urea solution to an outlet, a flow passage extending from the first inlet to a seating surface, and a valve member configured to move between an open position in which the valve member is spaced apart from the seating surface and a closed position in which the valve member contacts the seating surface. As the valve member moves from the open position to the closed position the valve member contacts the seating surface at a first location and wipes an area of the seating surface extending from the first location in a direction toward the flow passage. In certain forms the valve member deforms as it wipes the area of the seating surface. In certain forms the valve member comprises a ball-shaped portion in the open position which contacts the seating surface and deforms as it moves to the closed position. In certain forms the valve member comprises a first surface that receives force from a biasing member, a second surface that receives force from pressurized gas. In certain forms the valve member is biased toward the closed position by the force from the biasing member and moves to the open position when the pressurized gas has a pressure above a pressure threshold. In certain forms the seating surface comprises a frustoconical surface. In certain forms a spheroid protrusion of the valve member contacts the frustoconical portion and deforms during movement from the open position to the closed position to wipe the area. In certain forms the valve member dislodges urea crystals formed on the seating surface as it wipes the seating surface. In certain forms the valve member comprises a flexible diaphragm having a ball-shaped protrusion extending in a direction toward the seating surface, the ball shaped protrusion being space apart from the seating surface in the open position, contacting the seating surface in the closed position, and wiping the area of the seating surface as it moves from the open position to the closed position. Certain forms further comprise a metering valve configured to provide urea solution to the second inlet and an air shut-off valve configured to selectably shut off a supply of pressurized gas to the valve member.

Certain exemplary embodiments are methods comprising providing a urea dosing system including a gas flow path in fluid communication with a blending chamber, a source of urea solution in fluid communication with the blending chamber, and a valve in fluid communication with the gas flow path, the valve including a closing member moveable relative to a contact surface, maintaining the closing member in a first position wherein the closing member is spaced apart from the contact surface, moving the closing member to a second position wherein the closing member contacts the contact surface, and moving the closing member to a third position wherein the closing member contacts a greater area of the contact surface than in the second position. The closing member slides along the contact surface during movement from the second position to the third position. In certain forms the closing member deforms during movement from the second position to the third position. In certain forms the maintaining the closing member in the first position includes providing gas pressure to the valve above a pressure threshold. In certain forms the moving the closing member to the second position includes providing gas pressure to the valve below the pressure threshold. In certain forms the closing member wipes urea crystals from the contact surface during movement from the second position to the third position. In certain forms the closing member comprises a ball shaped portion and the closing surface is funnel shaped.

Certain exemplary embodiments comprise urea dosing systems for exhaust aftertreatment. Certain exemplary systems comprise a source of pressurized gas, a check valve in fluid communication with the source of pressurized gas, the check valve including a closing member and a seating surface, the closing member being moveable relative to the seating surface to open and close the check valve, a flow passage in fluid communication with the check valve, a blending chamber in fluid communication with the flow passage, and a metering valve in fluid communication with the blending chamber, the metering valve configured to supply urea solution to the blending chamber. The closing member applies a wiping force to the contact surface as the check valve closes. In certain forms the wiping force is applied over an area of the contact surface in a direction toward the flow passage. In certain forms the closing member comprises a spheroid portion that applies the wiping force to the contact surface. In certain forms the contact surface is frustoconical and the spheroid portion deforms as it applies the wiping force to the contact surface. In certain forms the wiping force is effective to remove urea crystals from the contact surface as the check valve closes. In certain forms the closing member elastomerically deforms as it applies the wiping force. In certain forms the wiping force is applied over an area of the seating surface extending from a first location of the seating surface to a second location of the seating surface, the first location being upstream from the second location relative to a flow direction of pressurized gas from the source to the flow passage. In certain forms the flow passage provides pressurized gas to the bending chamber in a direction substantially perpendicular to the flow of urea solution from the metering valve through the blending chamber.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. An apparatus for urea dosing of an exhaust aftertreatment system, the apparatus comprising:
   a urea solution source;
   a chamber configured to receive pressurized gas from a gas outlet, receive urea solution from the urea solution source via a urea outlet, and provide a combined flow of pressurized gas and urea solution;
   a gas passage extending from the gas outlet to a seating surface; and
   a valve member configured to move between an open position in which the valve member is spaced apart from the seating surface and a closed position in which the valve member contacts the seating surface;
   wherein as the valve member moves from the open position to the closed position the valve member contacts the seating surface at a first location and wipes an area of the seating surface extending from the first location in a direction toward the gas passage.

2. An apparatus according to claim 1 wherein the valve member deforms as it wipes the area of the seating surface.

3. An apparatus according to claim 1 wherein the valve member comprises a ball-shaped portion in the open position which contacts the seating surface and deforms as it moves to the closed position.

4. An apparatus according to claim 1 wherein the valve member comprises a first surface that receives force from a biasing member, a second surface that receives force from pressurized gas.

5. An apparatus according to claim 4 wherein the valve member is biased toward the closed position by the force from the biasing member and moves to the open position when the pressurized gas has a pressure above a pressure threshold.

6. An apparatus according to claim 1 wherein the seating surface comprises a frustoconical surface.

7. An apparatus according to claim 6 wherein a spheroid protrusion of the valve member contacts the frustoconical portion and deforms during movement from the open position to the closed position to wipe the area.

8. An apparatus according to claim 1 wherein the valve member dislodges urea crystals formed on the seating surface as it wipes the seating surface.

9. An apparatus according to claim 1 wherein the valve member comprises a flexible diaphragm having a ball-shaped protrusion extending in a direction toward the seating surface, the ball shaped protrusion being space apart from the seating surface in the open position, contacting the seating surface in the closed position, and wiping the area of the seating surface as it moves from the open position to the closed position.

10. An apparatus according to claim 1 further comprising a metering valve configured to provide urea solution to the urea outlet and an air shut-off valve configured to selectably shut off the pressurized gas to the valve member.

* * * * *